Jan. 26, 1932.   H. H. KARR   1,842,613
AIRPLANE
Filed Jan. 31, 1928   2 Sheets-Sheet 1
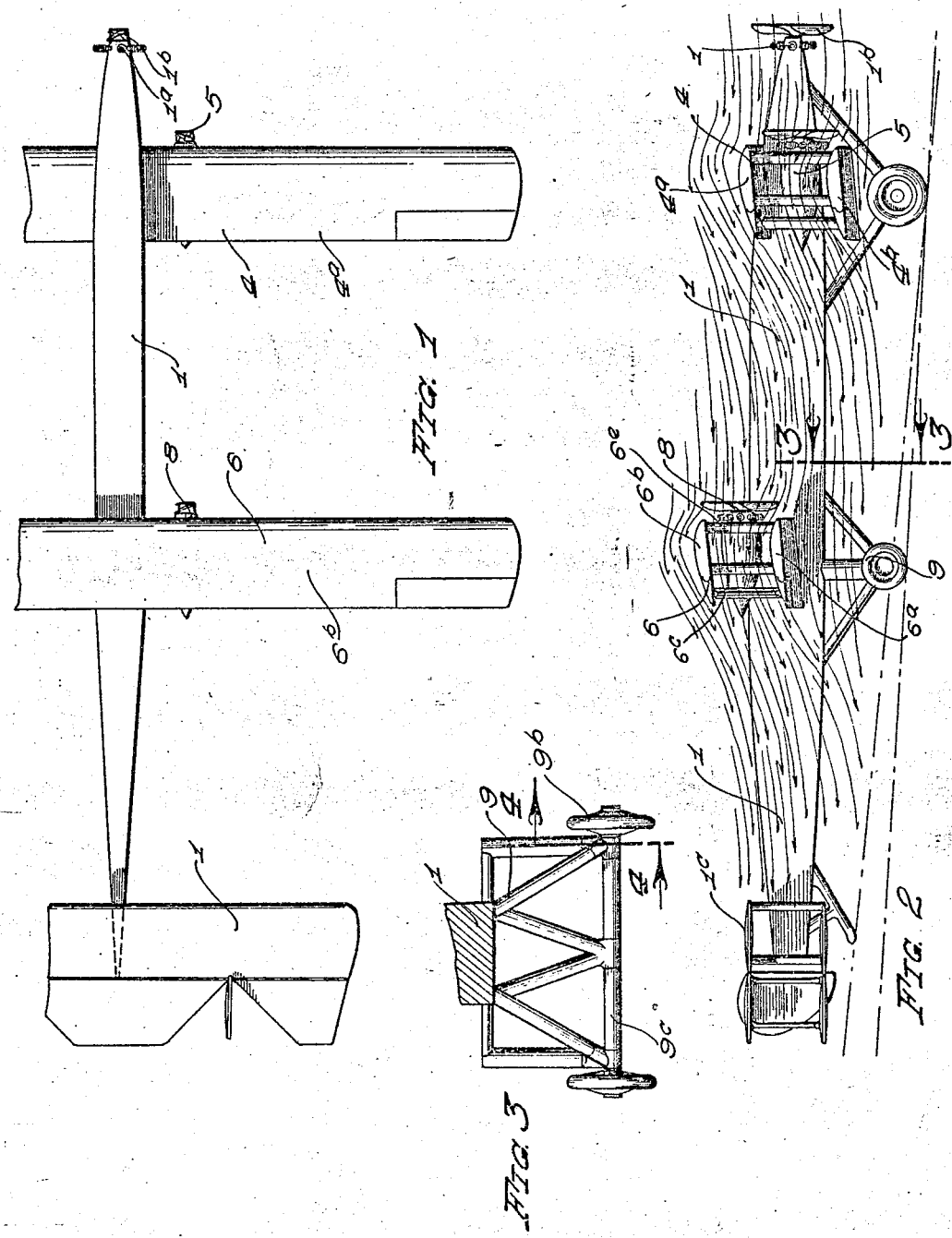
INVENTOR.
HAROLD H. KARR
BY A. B. Bowman
ATTORNEY.

Jan. 26, 1932. H. H. KARR 1,842,613
AIRPLANE
Filed Jan. 31, 1928 2 Sheets-Sheet 2
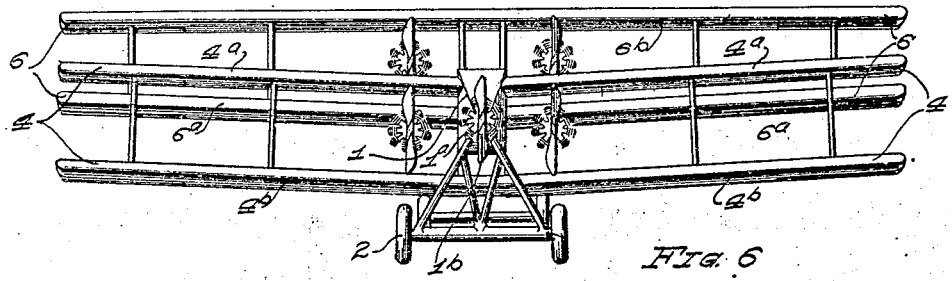
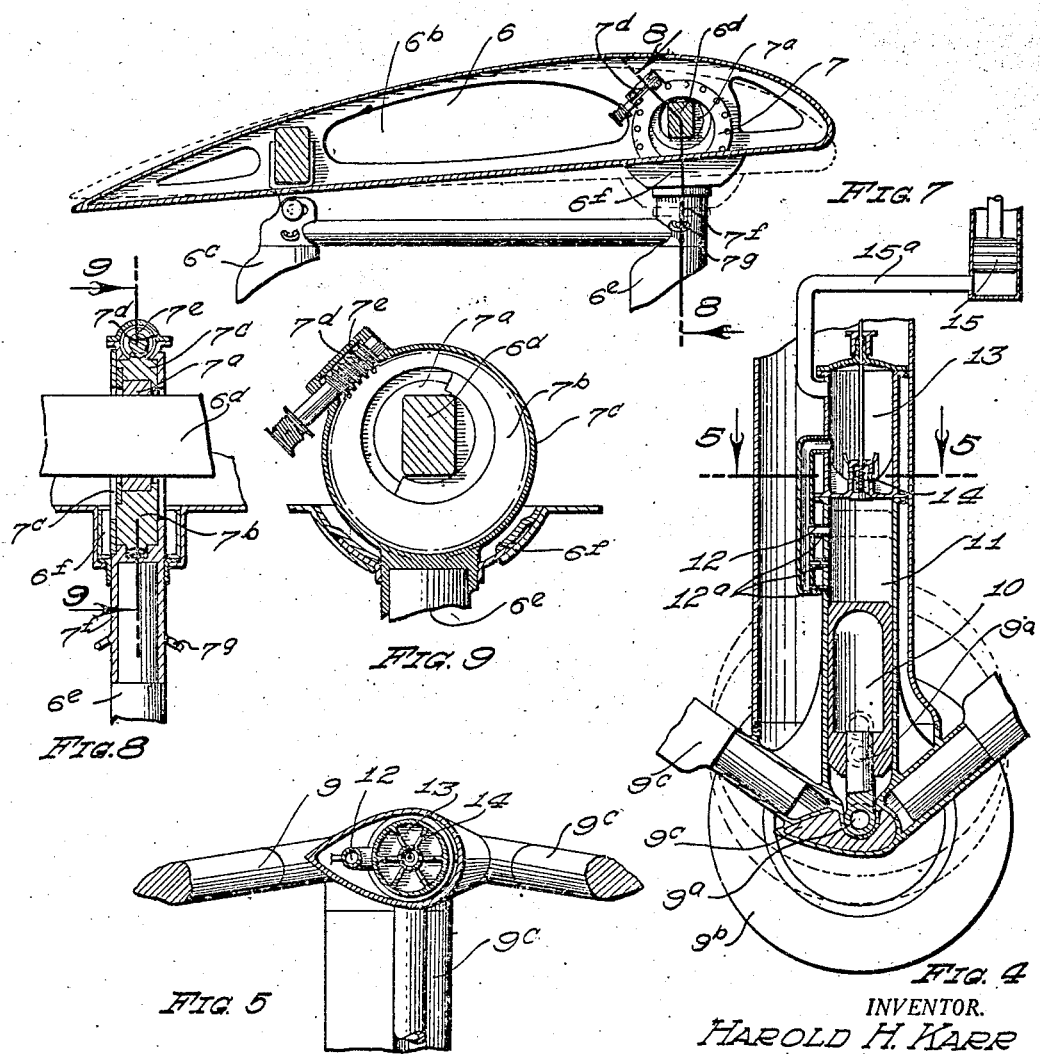
INVENTOR.
HAROLD H. KARR
BY A. B. Bowman
ATTORNEY Patented Jan. 26, 1932

1,842,613

UNITED STATES PATENT OFFICE

HAROLD H. KARR, OF SAN DIEGO, CALIFORNIA

AIRPLANE

Application filed January 31, 1928. Serial No. 250,788.

My invention relates to airplanes and the objects of my invention are: first, to provide an airplane structure which is sustained by sets of wings arranged in tandem with the stern set of wings positioned slightly above the center line of the forward set of wings and clear of the wash therefrom; second, to provide an airplane of this class in which the angle of incidence of one or more of the planes may be varied to facilitate the piloting of the airplane; third, to provide an airplane of this class in which an auxiliary landing gear is positioned between the tail skid and the forward landing gear to relieve the strain on the fuselage when landing; fourth, to provide an airplane structure of this class in which an auxiliary landing gear positioned between the forward landing gear and tail skid may be raised clear of the ground for facilitating the taxiing of the airplane; fifth, to provide an airplane structure of this class in which an auxiliary landing gear positioned intermediate the forward landing gear and tail skid may be used to elevate the tail of the plane when taking off, thus reducing the distance necessary for taking off to a minimum; sixth, to provide an airplane of this class in which a maximum of wing surface is provided with a minimum overall length and width, thus providing an airplane of large carrying capacity; seventh, to provide an airplane of this class in which the wing structure is adaptable for either landplanes, seaplanes or flying boats; eighth, to provide an airplane of this class in which motors may be mounted on the several sets of wings in such a manner that no one of the motors need run for the complete length of the flight of the airplane; thus, should any motor become disabled during the flight the airplane will not be forced down, and ninth, to provide an airplane structure of this class which is simple of construction, proportionate to its functions and especially adapted for the larger sized aircrafts.

With these and other objects in view as will appear hereinafter my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a fragmentary top or plan view of my airplane structure; Fig. 2 is a side elevational view thereof; Fig. 3 is an enlarged sectional view through 3—3 of Fig. 2 showing the auxiliary landing gears with the fuselage in outline; Fig. 4 is a still further enlarged fragmentary sectional view through 4—4 of Fig. 3; Fig. 5 is a transverse sectional view through 5—5 of Fig. 4; Fig. 6 is a front elevational view of my airplane structure; Fig. 7 is an enlarged transverse sectional view through one of the wings thereof showing the means for changing the angle of incidence thereof; Fig. 8 is a sectional view through 8—8 of Fig. 7; Fig. 9 is a sectional view through 9—9 of Fig. 8.

Similar characters of reference refer to similar parts and portions throughout the several views of the drawings.

Fuselage 1, forward landing gear 2, tail skid 3, forward wing set 4, forward power units 5, rear wing set 6, cam mechanism 7, rear power plants 8, auxiliary landing gear 9, piston 10, piston cylinder 11, bypass 12, reservoir cylinder 13, relief valve 14, and pump 15 constitute the principal parts and portions of my airplane structure.

The fuselage 1 is similar in general construction to the conventional airplane fuselage with any conventional type of motor 1a and propeller 1b at the forward end thereof. The rear portion of the fuselage 1 is provided with horizontal and vertical rudders 1c sufficient in size to guide the airplane. It is preferred in the larger sizes to have the horizontal and vertical rudders arranged in pairs as shown best in Fig. 2 of the drawings. A conventional type of landing gear 2 is provided at the forward portion of the fuselage and the conventional tail skid 3 at the rear portion thereof.

A biplane wing structure 4 extends transversely to the fuselage 1 and is secured thereto in the conventional manner. The upper wing 4a extends from the upper portion of the fuselage 1 and the lower wing 4b extends under the fuselage as shown best in Figs. 2 and 6 of the drawings. A power unit 5 is mounted between the forward wings 4a and a suitable fuselage 1. A second, rear wing set extends transversely relative to the fuselage 1. The lower wing 6a extends from a portion intermediate the upper and the lower sides of the fuselage. It is preferred to provide the wings 4a, 4b and 6a with a slight dihedral angle.

The upper wing 6b of the rear wing set 6 is preferably without a dihedral angle but the angle of incidence thereof is variable. The rear portion of the wing 6b is hinged to the rear wing struts 6c. The entering edge of the wing 6b is raised and lowered by means of a cam mechanism 7.

The cam mechanism 7 consists of a bushing 7a which is secured to the longitudinally extending wing reinforcing 6d. An eccentric collar 7b which is provided with gear teeth extending from the central portion of the periphery thereof is revolubly mounted on the bushing 7a. A housing 7c is mounted over the eccentric collar 7b and serves as an outer bearing therefor. The housing 7c is provided with an enlarged portion 7d in which is mounted a worm gear 7e which engages the teeth on the periphery of the eccentric collar 7b. The worm gear 7e is operated by suitable means controlled by the pilot. The lower portion of the housing 7c is provided with a sleeve 7f in which is secured the forward strut 6e. Suitable loops or rings 7g are mounted on the sleeve portion 7f for securing guy wires, not shown. A suitable weather tight collar 6f which fits snugly, yet is slidable relative to the sleeve portion 7f, is mounted in the wing 6. It will be seen that the wing is supported rigidly at all times, yet the angle of incidence thereof may be quickly changed, thus facilitating the handling of the plane especially when taking off or landing. A pair of power units are mounted between the upper and lower wings of the wing set 6 adjacent to the fuselage.

The position of the rear set of wings relative to the front set of wings varies with the different types of wing structures. The most favorable position of the rear set of wings relative to the front set of wings is such that the wash from the front set of wings clears the back set of wings. It will be noted from the set of arrows in Fig. 2 of the drawings, that the wash from the front set of wings tends to pass downwardly and under the rear set of wings due to the angle of attack of the front set of wings. Thus there can be a certain amount of lateral overlapping of the upper wing of the front set and lower wing of the rear set. At the same time it is important that the rear set of wings be spaced a sufficient distance from the horizontal and vertical rudders so that the rudders will not be affected by the wash from either set of wings. Thus it will be seen that the lifting force of the airplane is substantially equal to the sum of the lifting power of the front set of wings and the rear set of wings. Thus it is possible to reduce the overall width of an airplane and yet have a large carrying capacity.

It is desirable in the larger sizes of this airplane to have an auxiliary landing gear 9 positioned approximately under the rear set of wings. The auxiliary landing gear is provided with landing struts of conventional design. The true axle 9a of the landing wheels 9b is vertically movable relative to the false axle and landing struts 9c. The end portions of the axle 9a is provided with upwardly extending shafts 9d. Each shaft 9d is secured to a piston 10 which is slidable within a cylinder 11. A bypass 12 is provided which has a plurality of ports 12a connecting with the cylinder 11. A reservoir cylinder 13 is mounted above the cylinder 11 and is connected with the bypass 12. A suitable relief valve 14 is mounted between the reservoir cylinder 13 and piston cylinder 11. A passage 15a extends from the reservoir cylinder 13 to a suitable pump 15, as shown diagrammatically in Fig. 4 of the drawings. The pump 15 may produce either a vacuum or a pressure in the reservoir cylinder.

When the plane lands the forward landing gear 2 first touches the ground, then the second auxiliary landing gear 9 engages the ground and causes the piston 10 to move in the cylinder 11 forcing a fluid through the bypass 12 into the reservoir cylinder 13. As the wheels 9b gradually rise the tail skid 3 comes in contact with the ground. When the tail skid and forward landing gear are in contact with the ground and the airplane is ready for taxiing, the pump 15 is used to produce a partial vacuum within the reservoir cylinder 13, which raises the auxiliary landing gear wheels 9b clear of the ground. In taking off the pump 15 is used to produce a pressure in the reservoir cylinder which when the valve 14 is released, causes the wheels 9b to raise the tail skid clear of the ground.

It will be noted that monoplane wings could be used in place of the biplane wings shown providing their relative positions are such that the rear wings are clear of the wake from the forward wings.

It is obvious from the construction as illustrated in the drawings and described in the foregoing specification that there is provided a device as aimed at and set forth in the objects of the invention and though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In an airplane structure of the class described, a pair of biplane wing sets only, a fuselage, one of said biplane wing sets extending outwardly from the forward portion of said fuselage, the second biplane wing set extending outwardly from the central portion of said fuselage, said second mentioned biplane wing set positioned above the wash of said forward wing set and means for changing the angle of incidence of the one wing only of said rear biplane wing set.

2. In an airplane structure of the class described, a fuselage, a forward landing gear secured thereto, a tail skid secured thereto, an auxiliary landing gear mounted between said forward landing gear and said tail skid, a pair of biplane wing sets only, one of said wing sets extending from the forward portion of said fuselage and the second wing set extending from the central portion of said fuselage and positioned above the wash of said forward set of wings so as to clear said wash.

3. In an airplane structure of the class described, a fuselage, a forward landing gear secured thereto, a tail skid secured thereto, an auxiliary landing gear mounted between said forward landing gear and said tail skid, a pair of biplane wing sets only, one of said wing sets extending from the forward portion of said fuselage, the second wing set extending from the central portion of said fuselage and positioned above the wash of said forward set of wings and means for changing the angle of incidence of one of said wings so as to clear said wash.

4. In an airplane structure of the class described, a sustaining surface, the rear portion thereof hinged on rear supporting struts, a plurality of spaced apart bushings secured to the frame work of said sustaining surface, eccentric collars mounted on said bushing, housings mounted over said eccentric collars and secured to forward supporting struts, and means for revolving said eccentric collars relative to said bushings and said housings.

5. In an airplane structure of the class described, a plurality of sustaining surfaces positioned in tandem, the rear sustaining surface positioned above the wake of the forward sustaining surface, the one of said sustaining surfaces hinged at its rear portion on rear supporting struts, a plurality of spaced apart bushings secured to the frame work of said sustaining surface, eccentric collars mounted on said bushing, housings mounted over said eccentric collars and secured to forward supporting struts, and means for revolving said eccentric collars relative to said bushings and said housings.

6. In an airplane structure of the class described, a fuselage, a biplane wing set extending outwardly from the forward portion of said fuselage, a second biplane wing set extending outwardly from the central portion of said fuselage, a said second mentioned biplane wing structure positioned above the wake of said forward wing structure, the one of said wings hinged at its rear portion on rear supporting struts, a plurality of spaced apart bushings secured to the frame work of said wing, eccentric collars mounted on said bushing, housings mounted over said eccentric collars and secured to forward supporting struts, and means for revolving said eccentric collars relative to said bushings and said housings.

7. In an airplane structure of the class described, a fuselage, a forward landing gear secured thereto, a tail skid secured thereto, an auxiliary landing gear mounted between said forward landing gear and said tail skid, a wing set extending from the forward portion of said fuselage, a second wing set extending from the central portion of said fuselage and positioned above the wake of said forward set of wings, one of said wings hinged at its rear portion on rear supporting struts, a plurality of spaced apart bushings secured to the frame work of said wing, eccentric collars mounted on said bushing, housings mounted over said eccentric collars and secured to forward supporting struts, and means for revolving said eccentric collars relative to said bushings and said housings.

8. In an airplane structure of the class described, a relatively long fuselage, a main wing set positioned near the front end of said fuselage, a second main wing set positioned near the center of said fuselage, a forward landing gear, a rear landing skid, and a vertically movable, central landing gear positioned substantially under said second wing set, and means for raising and lowering said central landing gear with relation to said forward landing gear and rear skid, whereby said central landing gear is adapted to receive the weight of the rear portion of the airplane and support said skid in raised position at the moment of taking off and landing.

9. In an airplane structure of the class described, a relatively long fuselage, a main wing set positioned near the front end of said fuselage, a second main wing set positioned near the center of said fuselage, a forward landing gear, a rear landing skid, and a vertically movable, central landing gear positioned substantially under said second wing set, means for varying the angle of incidence of said central wing set for causing an increased lifting action on the central portion of the airplane during the landing and taking off periods, and means for controlling the level of said central landing gear relative to the forward gear and rear skid for causing suitable distribution of the weight of said plane on said landing gears during said periods.

10. In an airplane structure of the class described, a relatively long fuselage, a main wing set positioned near the front end of said fuselage, a second main wing set positioned near the center of said fuselage, a forward landing gear, a rear landing skid, and a vertically movable, central landing gear positioned substantially under said second wing set, manually operative means for varying the angle of incidence of said central wing set for causing an increased lifting action on the central portion of the airplane during the landing and taking off periods, and pneumatic means operable by the pilot for controlling the level of said central landing gear relative to the forward gear and rear skid for causing suitable distribution of the weight of said plane on said landing gears during said period.

In testimony whereof I have hereunto set my hand at San Diego, California, this 20th day of January, 1928.

HAROLD H. KARR.